US005490001A

United States Patent [19]
Konuma

[11] Patent Number: 5,490,001
[45] Date of Patent: Feb. 6, 1996

[54] FERROELECTRIC LIQUID CRYSTAL DEVICE WITH AN AC ELECTRIC FIELD PRODUCING A HELICAL STRUCTURE

[75] Inventor: Toshimitsu Konuma, Kanagawa, Japan

[73] Assignee: Semiconductor Energy Laboratory Co., Ltd., Kanagawa, Japan

[21] Appl. No.: 207,125

[22] Filed: Mar. 8, 1994

Related U.S. Application Data

[63] Continuation-in-part of Ser. No. 793,539, Nov. 18, 1991, Pat. No. 5,305,127.

[30] Foreign Application Priority Data

Nov. 19, 1990 [JP] Japan .................................. 2-313102

[51] Int. Cl.[6] ...................... G02F 1/1343; G02F 1/1337; G02F 1/13; G02F 1/1339
[52] U.S. Cl. ............................ 359/056; 359/78; 359/100; 359/81; 359/51
[58] Field of Search ............................ 359/56, 78, 93, 359/100, 81, 51, 52

[56] References Cited

U.S. PATENT DOCUMENTS

| | | | |
|---|---|---|---|
| 4,139,273 | 2/1979 | Crossland et al. | 359/100 |
| 4,662,721 | 5/1987 | Harada et al. | 359/56 |
| 4,834,510 | 5/1989 | Fujita | 359/56 |
| 4,924,215 | 5/1990 | Nelson | 359/56 |
| 5,046,830 | 9/1991 | Nakanowatari | 359/100 |
| 5,258,865 | 11/1993 | Konuma | 359/100 |
| 5,305,127 | 4/1994 | Konuma | 359/56 |

FOREIGN PATENT DOCUMENTS 3-2833   1/1991   Japan .................................. 359/81

OTHER PUBLICATIONS

Coates et al., "Electrically Induced Scattering Textures in Smectic A Phases and Their Electric Reversal", J. Phys. D: Appl. Phys., vol. 11 1978, pp. 2025–2034.

Iwasaki et al., "Colour Switching in Ferroelectric Smectic Liquid Crystal by Electric Field", JPN, J. Appl. Phys. vol. 18, No. 12, 1979, pp. 2323–2324.

Coates et al., "A Variable Tilt Smectic A Electro-optic Effect Giving Stoved Colours", Mol. Cryst. Liq. Cryst. vol. 41, 1978, pp. 151–154.

Primary Examiner—William L. Sikes
Assistant Examiner—Ron Trice
Attorney, Agent, or Firm—Sixbey, Friedman, Leedom & Ferguson; Gerald J. Ferguson, Jr.; Evan R. Smith

[57] ABSTRACT

A ferroelectric liquid crystal device including a pair of substrates each having an electrode, one of the substrates being subjected to an uniaxially-orienting treatment (one direction orientation treatment), and the other being subjected to no uniaxially-orienting treatment, and a layer of ferroelectric liquid crystal material interposed between the substrates is disclosed. The layer includes a liquid crystal region in which stripe patterns occur by application of an alternating electric field to the liquid crystal to scatter light incident to the device. A method of driving a ferroelectric liquid crystal device is also disclosed. The tone and intensity of the incident light can be controlled by controlling a voltage and/or frequency of the alternating electric field in accordance with the method.

11 Claims, 4 Drawing Sheets

FERROELECTRIC LIQUID CRYSTAL DEVICE WITH AN AC ELECTRIC FIELD PRODUCING A HELICAL STRUCTURE

RELATED APPLICATION

This application is a continuation-in-part of Ser. No. 07/793,539 filed Nov. 18, 1991 which is now U.S. Pat. No. 5,305,127.

BACKGROUND OF THE INVENTION

1. Field of the Invention

This invention relates to a liquid crystal electro-optic device such as a liquid crystal display device, a liquid crystal optical shutter array and the like, and more particularly to a liquid crystal electro-optic device whose display and driving characteristics are improved using an effective orientation of liquid crystal molecule.

2. Prior Art

As a conventional liquid crystal electro-optic device has been known a device using twisted nematic liquid crystal (hereinafter referred to as "TN liquid crystal"). The TN liquid crystal has a weak point that it generates a crosstalk in a matrix-type driving control using high pixel density. In addition, an active matrix display device which has a thin film transistor assigned to each pixel is also well known, but it still has problems that it is more difficult to obtain high production yield as a device size becomes larger, and that it also requires an enormous plant investment.

On the other hand, ferroelectric liquid crystal which was found by Myer et al. in 1977 is attracting public attention and studied intensively because of specific properties thereof.

FIG. 3 shows an orientation state of ferroelectric liquid crystal which has been generally accepted. Ferroelectric liquid crystal material interposed between a pair of substrates has a layered structure, and liquid crystal molecules thereof are spirally oriented along a side surface of each corn. For use of such a ferroelectric liquid crystal in a liquid crystal electro-optic device such as a display device, there have been proposed various modes such as a surface-stabilizing mode disclosed by Clark or Lagerwell, a scattering mode disclosed by Yoshino, or a mode using antiferro-electric liquid crystal, etc. All modes as described above utilize a common feature of the ferroelectric liquid crystal which would develop when the spiral structure of ferroelectric liquid crystal molecules is broken by some methods.

One of these methods is to narrow a gap of the substrates or applying strong electric field to the ferroelectric liquid crystal. Particularly, a method disclosed in U.S. Pat. No. 4,367,924 by Clark has a condition that a gap interval between the substrates is required to be shorter than a distance at which the spiral structure is formed and to be five times or less of a spiral pitch. The gap interval satisfying the above condition enables a liquid crystal state to become a surface-stabilized ferroelectric liquid crystal state, and thus the ferroelectric liquid crystal device develops attractive features thereof such as a storing property (memory property), high response speed and so on. However, this method positively utilizes a property of the substrates of suppressing the formation of a spiral structure of the ferroelectric liquid crystal, and therefore various characteristics of the device are liable to be affected by the substrates or an orientation control means provided on the substrates. For example, switching characteristic of the device is affected by them so that there frequently occurs that the motion of the liquid crystal molecules is not uniform when the liquid crystal molecules are driven by a plus electric signal and a minus electric signal having the inverted waveforms to each other (symmetric electric signals).

In addition, these characteristics of the liquid crystal are not invariable ones at all times, but are timevariable ones, so that the device whose switching operation is stabilizingly carried out has not been obtained yet.

SUMMARY OF THE INVENTION

This invention is based on a technical idea different from a conventional idea that stabilization of ferroelectric liquid crystal molecules is implemented by provision of a narrow gap between substrates.

An object of this invention is to provide a ferroelectric liquid crystal device having a novel mode in orienting and switching operations of the ferroelectric liquid crystal as shown in FIG. 1 to overcome the disadvantage of the prior art.

It is another object of the present invention to provide a method of driving a ferroelectric liquid crystal device in a novel mode.

In order to attain the above and other objects, a ferroelectric liquid crystal device according to this invention comprises:

a ferroelectric liquid crystal;

means for applying electric fields to said liquid crystal; and a pair of substrates for supporting said ferroelectric liquid crystal therebetween, said substrates having surfaces contiguous to said liquid crystal respectively, wherein said surfaces have different influences to said liquid crystal from each other and said liquid crystal scatters light incident thereon in response to application of an alternating electric field thereto. For example, an orientation control surface, e.g. a surface of a polyimide film subjected to one direction orientation treatment (e.g. rubbing treatment), is provided as one of the contiguous surfaces on only one of the inside surfaces of the substrates in order to effect influence to the liquid crystal different from influence of the other one of the contiguous surfaces to the liquid crystal.

The ferroelectric liquid crystal may comprise a region located adjacent to and influenced by the orientation control surface and a region located apart from the orientation control surface and scattering light incident on the liquid crystal when applying an alternating electric field thereto. In the region located apart from the orientation control surface, stripe patterns microscopically occur by application of an alternating electric field to the liquid crystal and light incident on the liquid crystal is scattered there when an alternating electric field is applied to the liquid crystal.

In the operation of the device, voltage applied to the liquid crystal and/or frequency of the alternating electric field are controlled in order to control tone and intensity of light having passed through the liquid crystal by taking advantage of the scatter of the incident light in the liquid crystal. Thus, a black-and-white display and a gradation black-and-white display (e.g. a black-and-gray-and-white display) and a color display and a gradation color display can be carried out by the device.

DETAILED DESCRIPTION OF THE PREFERRED EMBODIMENTS

Figure 1:
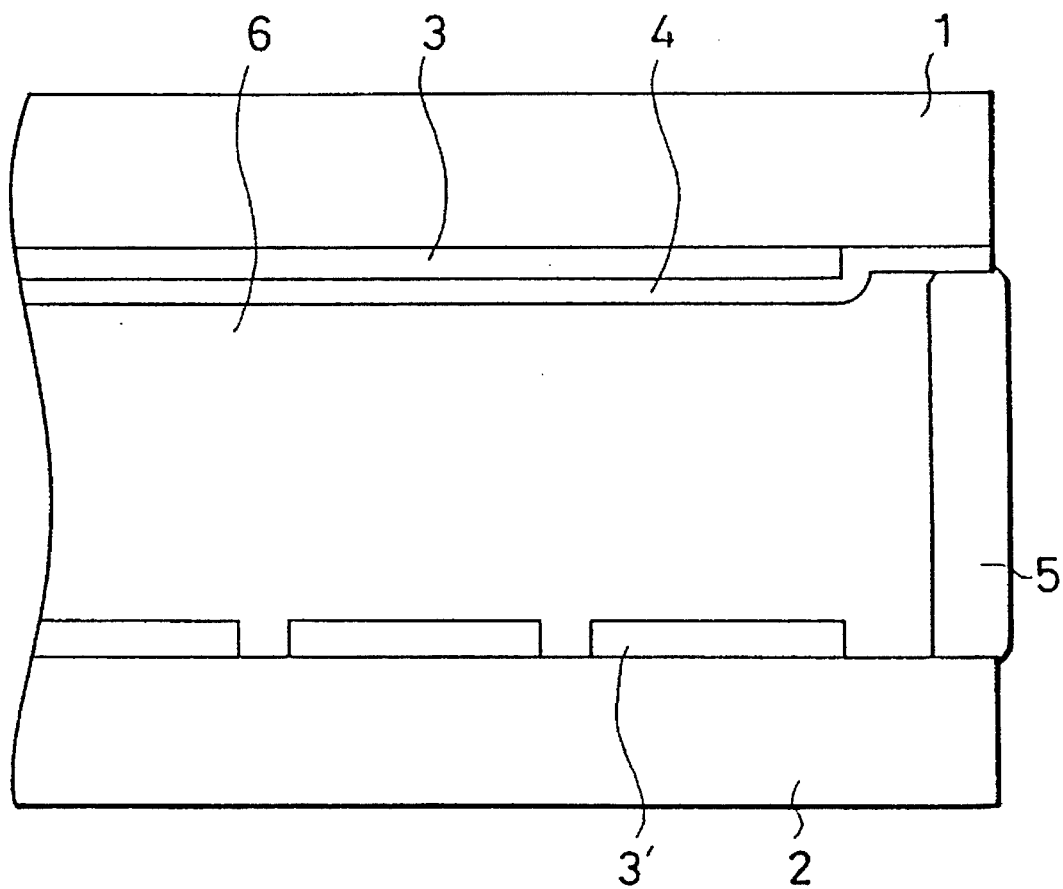
FIG. 1 is a schematic view of a liquid crystal optical device to which this invention is applied.

FIG. 1 is a cross-sectional view of a ferroelectric liquid crystal device according to this invention. The device as shown in FIG. 1 is schematically illustrated and thus the dimension ratio of elements of the device is not necessarily equal to that of a practically-used liquid crystal device.

Characteristics of ferroelectric liquid crystal was experimentally studied using a device which was provided with a pair of substrates 1 and 2 in parallel to each other, one substrate 1 having an area 4 subjected to an uniaxially-orienting treatment (hereinafter referred to as "treated substrate"), and the other substrate 2 having no area subjected to the uniaxially-orienting treatment (hereinafter referred to as "non-treated substrate"). A gap interval between the substrates is set to 5 microns or more. The liquid crystal molecules interposed between the substrates are oriented in parallel to the treated substrate.

When an alternating electric field is applied to the liquid crystal having such an orientation state, a stripe pattern 7 appears perpendicularly to a normal to a layer of the liquid crystal on the non-treated substrate which is not subjected to the uniaxially-orienting treatment (one direction orientation treatment). On the other hand, a liquid crystal layer on the treated substrate which is subjected to the uniaxially-orienting treatment tends to maintain its original orientation state even by applying the alternating electric field because the treated substrate suppresses any motion of the ferroelectric liquid crystal molecules. In short, there exist a dual structure in the liquid crystal layer, which includes two types of liquid crystal layer portions, one contiguous to the treated substrate and the other contiguous to the non-treated substrate.

In the former liquid crystal layer portion, domains appear because the motion of liquid crystal molecules is restricted by the treated substrate, while in the latter liquid crystal layer portion the liquid crystal molecules develop the spiral structure inherent to the ferroelectric liquid crystal molecules.

Figure 2A:
FIG. 2(A) is a copy of a microscopic photograph for the crystal state of a liquid crystal layer of this invention.
Figure 2B:
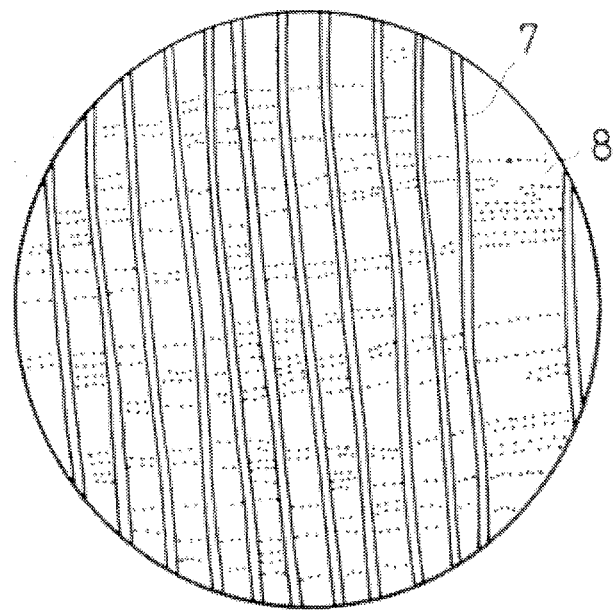
FIG. 2(B) is an outline sketch of the photograph of FIG. 2(A).
Figure 3:
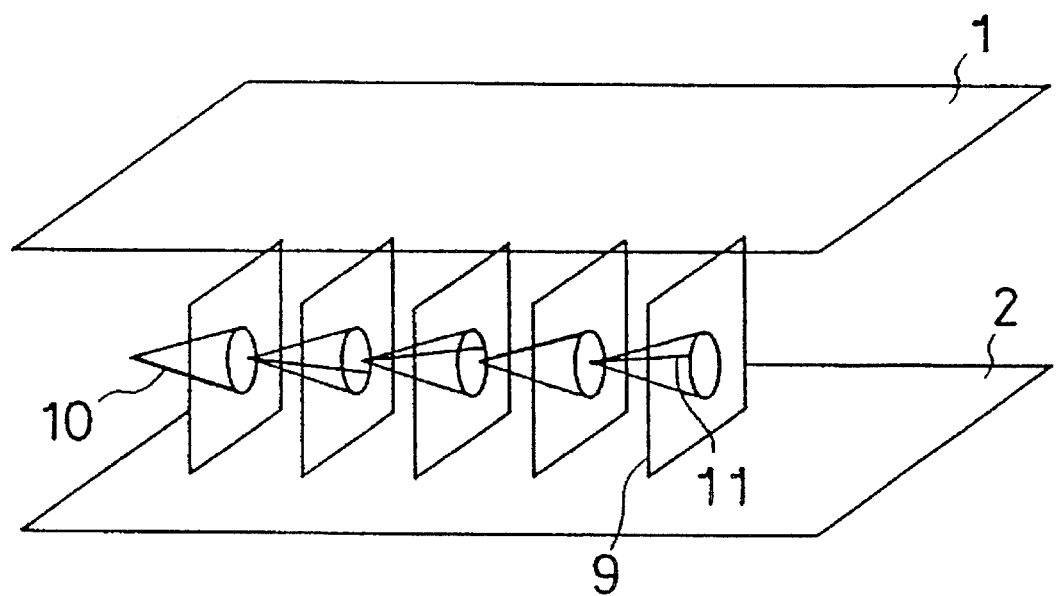
FIG. 3 shows a general orientation state of ferroelectric liquid crystal.

FIG. 2(A) is a copy of a microscopic photograph showing these portions. Since this photograph was taken under a condition that the non-treated substrate is brought into focus, stripe patterns representing the spiral structure are observed clearly and domains on the treated substrate are slightly dimly observed behind the stripe patterns. FIG. 2(B) is an outline sketch of the photograph as shown in FIG. 2(A).

The reason why the domain structure appears on the treated substrate supposedly resides in a point that a reverse motion of the ferroelectric liquid crystal molecules is prevented by an orientation control surface of the treated substrate. The stripe patterns which appear upon application of the alternating electric field are observed due to a repetitive arrangement of liquid crystal molecules in accordance with a prescribed rule. The ferroelectric liquid crystal molecules having long molecular axis in its molecule structure has anisotropy in optical refractive index and thus an incident light is scattered by the stripe patterns including the liquid crystal molecules which are dynamically moved by an applied alternating electric field.

A device such as a liquid crystal display device which utilizes the liquid crystal electro-optic effect as described above is implemented by forming stripe patterns in a ferroelectric liquid crystal cell with an applied alternating electric field to scatter an incident light.

The following description pertains to an example of a producing process of the device and an experimental result of the products.

(EXAMPLE 1)

In the process, transparent conductive films of 500 to 1000 Å in thickness, for example, ITO (indium tin oxide) films of 800 Å in thickness were first deposited on glass substrates 1 and 2 by DC sputtering, and then subjected to a patterning process to obtain a first set of parallel electrode strips 3 and a second set of parallel electrode strips 3'. After the patterning process, polyimide resin in the market, e.g. LQ5200 manufactured by Hitachi Chemical Co., Ltd., was spincoated on one of the substrates and burned at 280° C. for 2 hours and 30 minutes. Next, the polyimide was subjected to a rubbing treatment as an uniaxially-orienting treatment (one direction orientation treatment) by the use of a cotton velvet role having piles of 2.5 to 3 mm height and turning at 1000 to 1500 rpm with respect to the substrate moving at 100 to 400 cm/min. The rubbed surface of the polyimide serves as an orientation control surface. This substrate was joined with the other substrate (the non-treated substrate) at an interval of 50 microns by the use of resin particles as spacers so that the first set of parallel electrode strips 3 and the second set of parallel electrode strips 3' were arranged in an orthogonal relationship to form pixels at their intersections in matrix form, and then liquid crystal material was injected in a gap between the substrates to form a liquid crystal cell for experimental measurement. The liquid crystal material comprised ferroelectric liquid crystal which developed no nematic phase. A phase-variation of this liquid crystal is shown below.

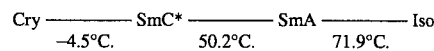

Cry ———— SmC* ———— SmA ———— Iso
    –4.5°C.      50.2°C.     71.9°C.

The liquid crystal comprises an optically active first liquid crystal represented by the following formula (I) at 2–30 mol %, an achiral base second liquid crystal represented by the following formula (II) at 55–80 mol % and a third liquid crystal represented by the following formula (III) at 2–15 mol %.

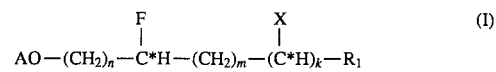

$$AO-(CH_2)_n-\overset{F}{\underset{|}{C^*H}}-(CH_2)_m-\overset{X}{\underset{|}{(C^*H)_k}}-R_1 \quad (I)$$

In the above formula (I), "A" stands for

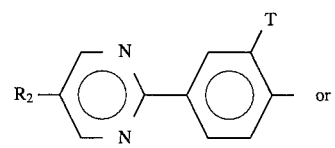

or

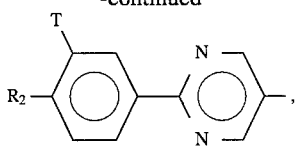

wherein $R_1$ is a straight chain alkyl group comprising 2–8 carbon atoms; $R_2$ is a straight chain alkyl group comprising 8–12 carbon atoms; T is a hydrogen atom or a fluorine atom; X is a fluorine atom or a methyl group; n=1 or 2; m=0–3; k=0–1; and C* is an asymmetric carbon atom.

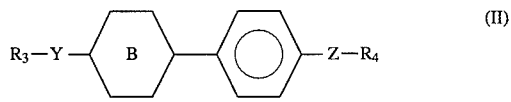

In the above formula (II),

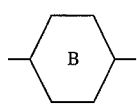

stands for

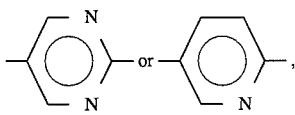

wherein $R_3$ and $R_4$ are straight chain or branched chain alkyl groups comprising 6–14 carbon atoms; Y and Z are a single bond or a —O— respectively.

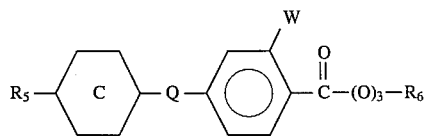

In the above formula (III),

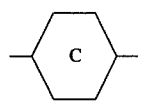

stands for

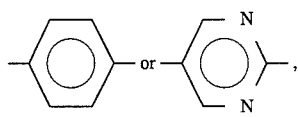

wherein $R_6$ is a straight chain alkyl or alkoxyl group comprising 6–14 carbon atoms; $R_6$ is a straight chain or branched chain alkyl group comprising 6–14 carbon atoms; Q is a single bond or —COO—; W is a hydrogen atom or a fluorine atom; J=0 or 1.

The alkyl group of $R_6$ may comprise an asymmetric carbon atom therein.

The light incident on the liquid crystal could be scattered at the pixel to which an alternating electric field is applied.

No stripe pattern was microscopically observed and multi-microdomains were observed in an initial orientation state of the liquid crystal (i.e. under application of no alternating electric field to the liquid crystal) in the liquid crystal. This orientation state was similar to that of the liquid crystal on the treated substrate which was subjected to the uniaxially-orienting treatment as indicated by the reference numeral 8 of 1 FIG. 2(B). In addition, a clear spiral structure was not observed in this state (the initial orientation state) irrespective of a large gap interval of the cell. Upon application of an alternating electric field of 50 KHz to the cell, stripe patterns representing the spiral structure appeared for the applied voltage ranging from 30 to 80 volts (the maximum voltage used in this experiment is limited to 80 volts). An extending direction of the stripe patterns was perpendicular to a normal to the ferroelectric liquid crystal layer.

In a polarizing microscopic observation with varying a focusing point, the stripe patterns were observed in a bulk region located apart from the orientation control surface rather than a region located adjacent to the orientation control surface.

An optical responsibility of the ferroelectric liquid crystal in the above state (i.e. under the application of the alternating electric field) was measured with a photomultiplier tube mounted on the polarizing microscope. It was found from the measurement of the optical responsibility that the liquid crystal molecules did not completely respond to the applied electric field to change a light-state to a dark-state or vice versa. In other words, the liquid crystal molecules underwent only part of the switching from the light-state to the dark-state or vice versa. A partial delay of the optical responsibility took place to form the stripe patterns. When the applied voltage is fixed to 40 volts and its frequency is varied, variation in color tone was observed from a view of a normal direction to the liquid crystal layer. The following table 1 shows this variation in color tone with respect to the frequency-variation.

TABLE 1

| RELATIONSHIP BETWEEN COLOR TONE AND FREQUENCY | |
|---|---|
| frequency (KHz) | color tone |
| 12 | white |
| 15 | Yellow |
| 21 | Blue |
| 59 | Yellow |
| 113 | Red |

(EXAMPLE 2)

Two types of liquid crystal cells which have the same structure as the cell of the Example 1, but have longer gap intervals of 15 microns and 100 microns, respectively, were also investigated.

The orientations states of the liquid crystal layer portions on the non-treated substrate and the treated substrate, and the bulk portion were also observed in both cells having different gap intervals. Further, upon application of an alternating electric field, stripe patterns appeared like the Example 1.

(EXAMPLE 3)

The following is a description ,for a third example of the invention in which a PCS-type (polymer columned spacer) liquid crystal device is employed.

Figure 4:
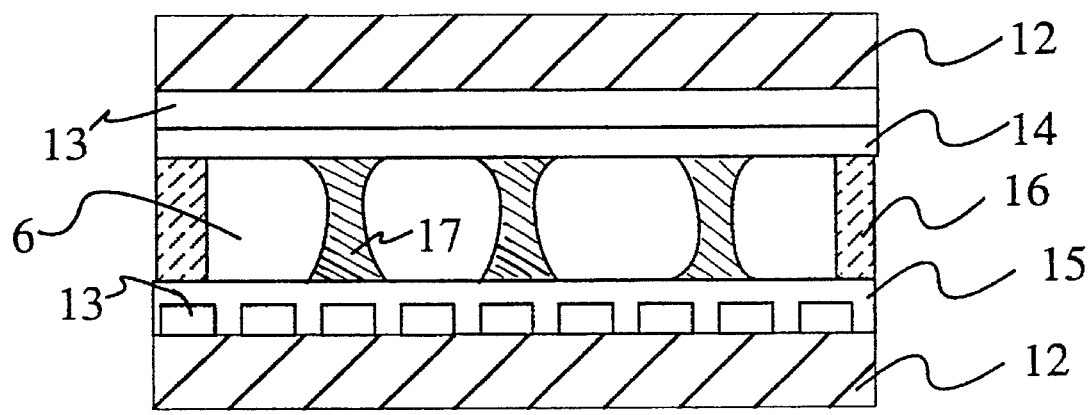
FIG. 4 is a schematic view of a third example of the invention.

An electrode arrangement 13 is formed on a pair of substrates by sputtering and patterning ITO as shown in FIG. 4. Next, polyimide layers 14 and 15 are provided by spin coating on both substrates 12 having an electrode arrangement thereon. The thickness of the polyimide layers wee 50–300 Å, for example, 100 Å. In this example, a uniaxial orientation treatment was performed on only one of the polyimide layers 14 or 15, for example, the layer 15. The other polyimide layer 14 was not subject to the uniaxial orientation treatment.

After distributing spacers such as silica particles (not shown) and providing a sealing member 16 on a periphery of the substrate, the substrates were mated with each other with a gap not lower than 5 μm, for example 6 μm therebetween.

A mixture of a ferroelectric liquid crystal (85–95%) and a UV curable resin (5–15%) was prepared. The liquid crystal used in the previous examples is also used in this example. The mixture was heated so that the liquid crystal becomes isotropic and introduced between the substrates. Then, the mixture was gradually cooled so that the liquid crystal exhibits smectic phase while the resin was segregated.

In the above condition, the resin was cured by irradiating the cell with a UV light so that columnar resin 17 adhered with both of the substrate surfaces. Accordingly, the orientation condition in accordance with the present invention was also realized in this example. The area occupied by the resin 17 was small enough so that it does not hinder the visibility of the display.

According to the ferroelectric liquid crystal device of this invention, it was found that the liquid crystal layer of the device was divided into two portions, in one of which the liquid crystal molecules were restrained in their motion by the uniaxially-oriented layer (orientation control surface) and in the other of which the liquid crystal molecules were not restrained in their motion thereby. Further, it was found that application of an electric field to this device generated stripe patterns, and an incident light was scattered in the region in which the stripe patterns were generated. From this fact, the device of this invention can be applied to a liquid crystal shutter device or display device as a novel switching mode.

According to this invention, an electro-optic effect of liquid crystal can be utilized in a novel mode. This liquid crystal device does not require a polarizer for an ON/OFF switching operation because this mode performs a scattering of an incident light thereto in all directions, and therefore is free from light loss due to the polarizer, thereby implementing a display device capable of displaying a virtually-light image. In addition, the tone or intensity of an incident light is variable by changing a voltage or frequency, so that a color display can be also implemented using this invention.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An electro-optical device comprising:
   a pair of substrates having an electrode arrangement thereon;
   a uniaxial orientation control means provided on a surface of only one of said substrates; and
   a light modulating layer containing a ferroelectric liquid crystal interposed between said substrates,
   wherein said light modulating layer includes a first region contiguous to said uniaxial orientation control means and a second region distant from said uniaxial orientation control means and no stripe pattern is observed in said first region while a stripe pattern is observed in said second region when an AC field is applied across said light modulating layer.

2. The electro-optical device of claim 1 wherein said stripe pattern is indicative of a spiral structure formed by said ferroelectric liquid crystal.

3. The electro-optical device of claim 1 wherein said light modulating layer has a thickness 5 μm or more.

4. The electro-optical device of claim 1 wherein said stripe pattern is observed through a polarizing microscope.

5. The electro-optical device of claim 1 wherein said stripe pattern dynamically moves during the application of said AC field.

6. An electro-optical device comprising:
   a pair of substrates having an electrode arrangement thereon;
   a uniaxial orientation control means provided on a surface of only one of said substrates; and
   a light modulating layer containing a ferroelectric liquid crystal interposed between said substrates,
   wherein said light modulating layer includes a first region contiguous to said uniaxial orientation control means and a second region distant from said uniaxial orientation control means, and wherein said ferroelectric does not form a spiral structure in said first region while said ferroelectric liquid crystal forms a spiral structure in said second region in response to an application of an AC field.

7. The electro-optical device of claim 6 wherein said light modulating layer has a thickness 5 μm or more.

8. An electro-optical device comprising:
   a pair of substrates having an electrode arrangement thereon;
   a uniaxial orientation control means provided on a surface of only one of said substrates; and
   a light modulating layer interposed between said substrates, said modulating layer comprising a mixture of a ferroelectric liquid crystal and a polymer,
   wherein said light modulating layer includes a first region contiguous to said uniaxial orientation control means and a second region distant from said uniaxial orientation control means, and wherein said ferroelectric does not form a spiral structure in said first region while said ferroelectric liquid crystal forms a spiral structure in said second region in response to an application of an AC field.

9. The electro-optical device of claim 8 wherein said polymer is contained in said modulating layer in the form of a plurality of columns extending between said uniaxial orientation control means and a most inner surface of another one of the substrates so that said substrates are fixed with each other.

10. The electro-optical device of claim 6 wherein said light modulating layer has a thickness 5 μm or more.

11. The electro-optical device of claim 6 wherein said polymer comprises a UV light cured resin.

* * * * *